Dec. 12, 1961  A. S. ANDERSON  3,012,617
RELEASABLE SHANK HOLDERS FOR CULTIVATORS AND THE LIKE
Filed Nov. 27, 1959  3 Sheets-Sheet 1
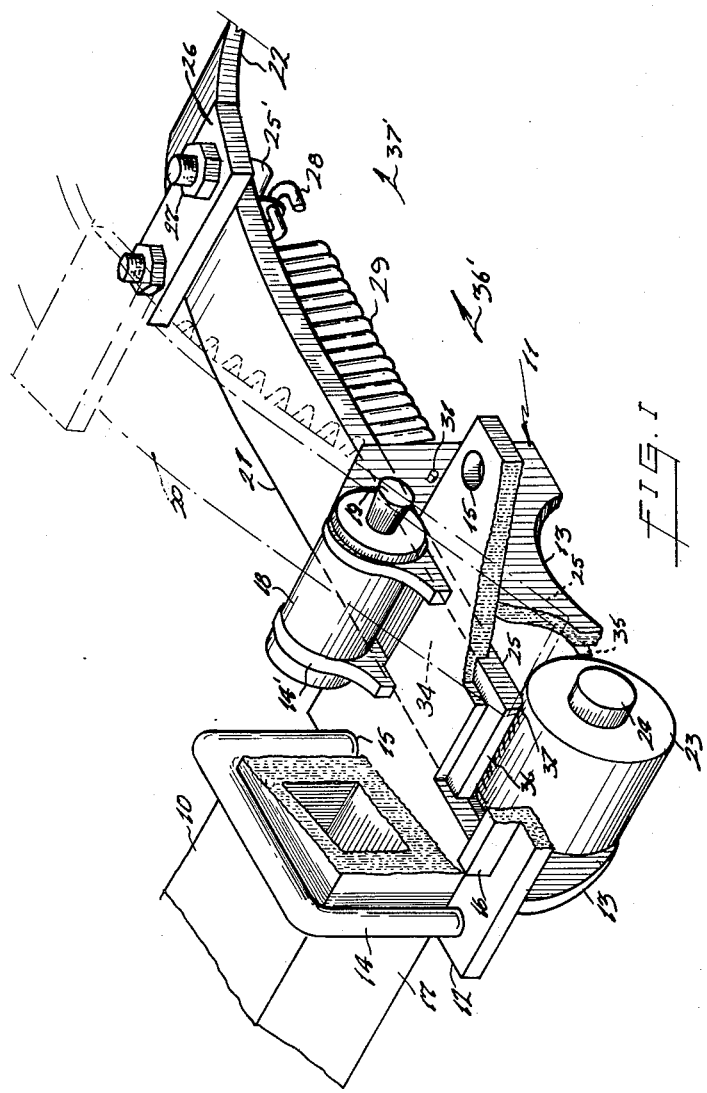
INVENTOR.
ANDERS. S. ANDERSON
BY
HIS ATTYS

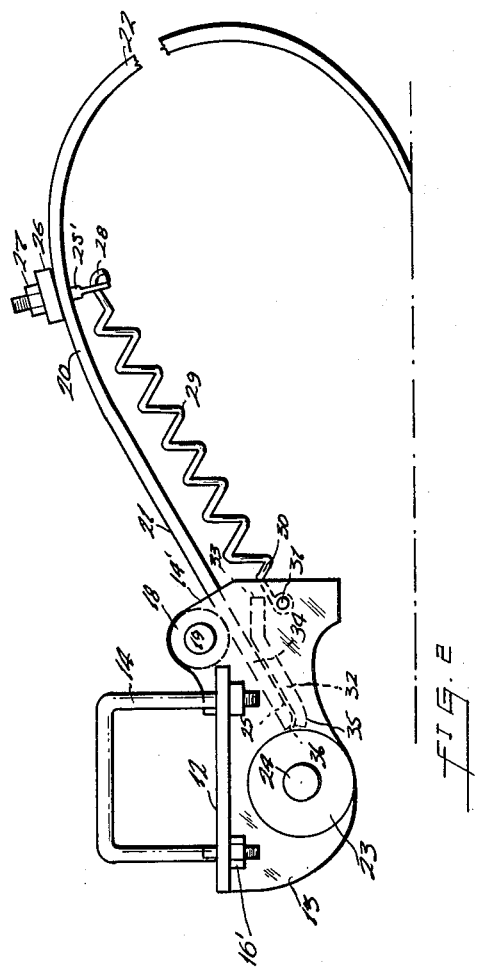

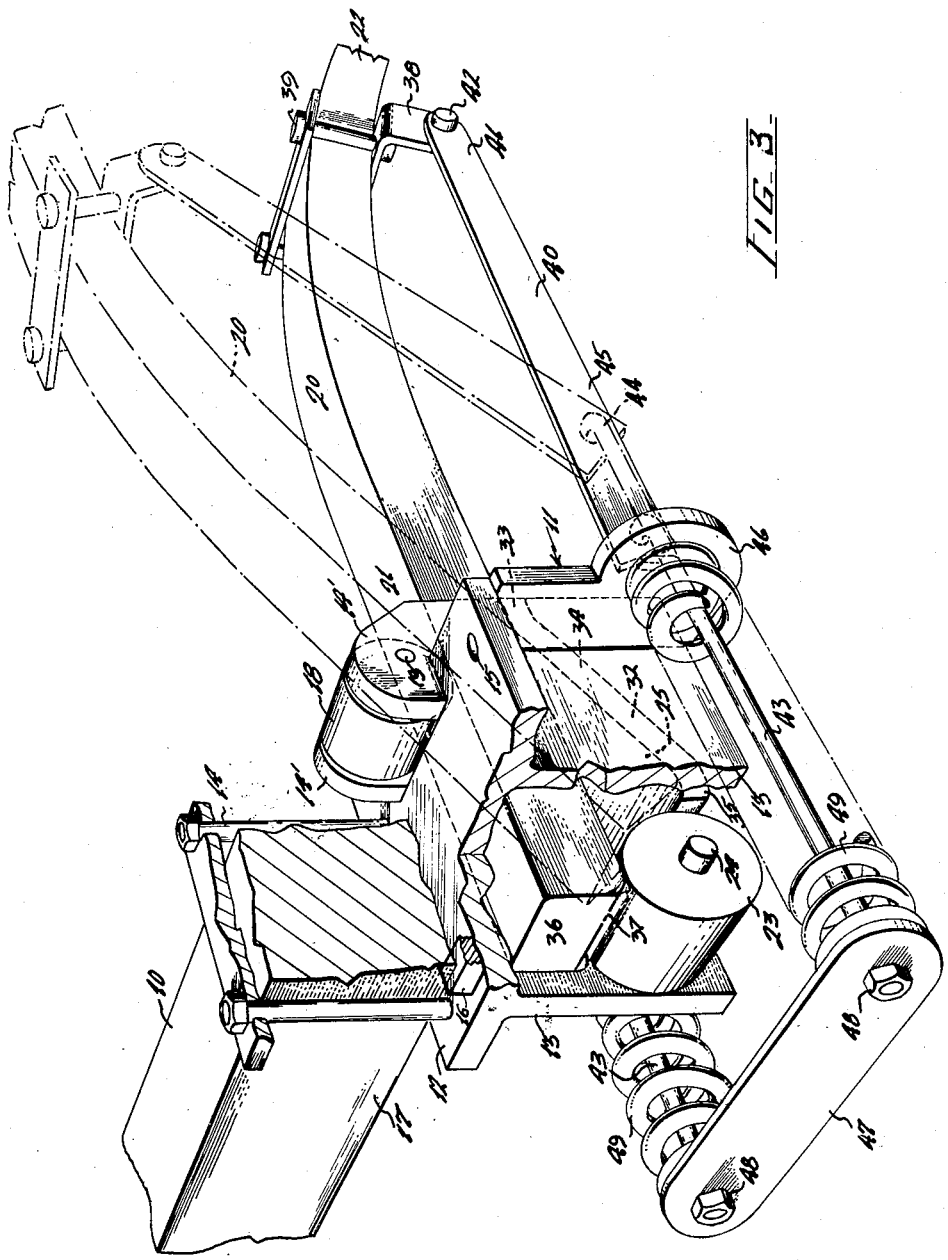

United States Patent Office 3,012,617
Patented Dec. 12, 1961

3,012,617
RELEASABLE SHANK HOLDERS FOR CULTIVATORS AND THE LIKE
Anders S. Anderson, Saskatoon, Saskatchewan, Canada, assignor to Roll-O-Matic Tiller Limited, Regina, Saskatchewan, Canada
Filed Nov. 27, 1959, Ser. No. 855,758
6 Claims. (Cl. 172—264)

My invention relates to new and useful improvements in cultivator shank holders, particularly adapted for use with cultivator shanks which are capable of being tripped when an obstruction is encountered.

It is conventional to provide cultivator shanks with linkage and pivots which enable the cultivator shank to pivot upwardly when an obstruction is encountered and to be forced downwardly by means of a spring after the obstruction has passed. However, this type of construction does not permit any parallel rearward motion neither does it include means whereby damage can be prevented from occurring to the structure if the cultivator shoe engages under an immovable obstruction thus preventing the tripping action.

Furthermore the majority of the devices of this nature rely upon the spring to maintain them in the operating position so that the slightest increase in resistance causes the shanks to pivot to a greater or lesser degree thus giving a variable depth to the cultivation.

I have overcome these disadvantages by providing a housing adapted to receive the upper end of the cultivator shank between a pair of rollers, said rollers being so positioned to provide frictional engagement of the shank when operated normally, yet permitting the shank to move rearwardly within limits parallel to the ground surface unless the obstruction is of such a nature that the shank moves beyond the rearward limits at which time the shank is permitted to trip. Furthermore I provide resilient means reacting between the shank and the housing and adapted to return the shank to the operating position. By incorporating a shear pin as the forward anchor of the spring means, the entire shank may be disengaged from the housing if an immovable object is encountered, without damaging or straining the remaining structure.

The principal object and essence of my invention is therefore to provide a cultivator shank housing which permits the shank to move rearwardly within limits prior to tripping.

A further object of my invention is to provide a device of the character herewithin described which permits the cultivator point or shovel to operate relatively parallel to ground level unless an obstruction is encountered.

A further object of my invention is to provide a device of the character herewithin described which includes means to return the shank to the operating position after the obstruction has been passed.

Yet another object of my invention is to provide a device of the character herewithin described in which the shank is maintained in parallel working position under normal working conditions without the use of resilient means.

Still another object of my invention is to provide a device of the character herewithin described which permits a free floating action to the cultivator shank without altering the depth of penetration of the cultivator point or shovel.

Still another object of my invention is to provide a device of the character herewithin described which is extremely simple in construction, economical in manufacture and otherwise well suited to the purpose for which it is designed.

With the foregoing objects in view, and such other objects and advantages as will become apparent to those skilled in the art to which this invention relates as this specification proceeds, my device consists essentially in the arrangement and construction of parts all as hereinafter more particularly described, reference being had to the accompanying drawings in which:

FIGURE 1 shows a fragmentary iso-metric view of the preferred embodiment of my device showing same attached to the cultivator frame.

FIGURE 2 is a side elevation of my device, in reduced scale to FIGURE 1, and showing the cultivator shank in the tripped position.

FIGURE 3 is a fragmentary iso-metric view of an alternative embodiment of my device showing same attached to a cultivator frame.

In the drawings like characters of reference indicate corresponding parts in the different figures.

Proceeding first to describe the preferred embodiment illustrated in FIGURES 1 and 2, reference character 10 illustrates the transverse frame member of a conventional cultivator (not illustrated).

A housing collectively designated 11 consists of an upper surface 12, depending side flanges 13, and rear bearing means support flanges 14′ extending upwardly from the upper surface 12. This housing is secured to the frame member 10 by means of U-bolt 14 passing through apertures 15 within the upper surface 12, nut 16′ securing the U-bolt upon the underside of the surface 12 in the usual manner.

In this connection it should be noted that I have provided thrust blocks 16 upon the upper surface 12, said thrust blocks engaging the front edge 17 of the frame member 10 thus taking the thrust load from the U-bolt 14.

Rear bearing means taking the form of a roller 18 is journalled for rotation upon a pin 19 supported by the aforementioned wings or flanges 14′ and this roller 18 is adapted to engage the upper surface 20 of the upper end 21 of the conventional cultivator shank 22.

Front bearing means, taking the form of a roller 23, is journalled for rotation upon a pin 24 supported between the side walls 13 of the housing and below the upper surface 12 thereof and this roller 23 is adapted to be engaged by the under surface 25 of the shank end 21 as clearly shown in FIGURE 1.

A U-bolt 25′ is secured to the shank 22 behind the housing by means of cross plates 26 and nut 27 and constitutes a bracket adapted to receive the rear end 28 of a tension spring 29.

The front end 30 of this spring engages around a shear pin 31 spanning the side walls 13 of the housing at the rear end thereof thus retaining the cultivator shank within the housing under normal conditions.

Spanning the side walls 13 of the housing 11, below the rear roller 18, is a saddle 32 including a parallel shank supporting rear portion 33, a forwardly and downwardly inclining portion 34, and an upturned end 35 adapted to receive the shank extremity 36 when the shank is in the tripped position as shown in FIGURE 2. In this connection it will be noted that the lower side 37 of the shank extremity 36 is curved to facilitate the rolling action over the roller 23 when the shank is tripped.

In operation, the device is normally in the position shown in full line in FIGURE 1. The applied thrust of the cultivator end whether it is a spade type or shovel type, causes a binding action of the shank 21 between the roller 18 and the roller 23 so that normally the spring 29 is not utilized to maintain the cultivator in its normal condition. However if there is an increased resistance during cultivation, the cultivator can move rearwardly in the direction of arrow 36′ against the tension of spring 29 thus maintaining the shovel point parallel with the surface of the ground and providing the resistance can be overcome (due to the fact that it does not exceed the tension spring 29), spring 29 returns the cultivator to the forward position without changing the draft of the implement.

However if the obstruction is relatively immovable, the tension of the spring 29 is overcome to the point whereby the rear extremity 36 of the cultivator shank clears the front roller 23 thus enabling the cultivator shank to pivot upwardly in the direction of arrow 37' to take up the position as shown in FIGURE 2 with the rear end of the cultivator shank resting in the saddle 32.

As soon as the obstruction is past, the tension spring 29 returns the cultivator shank to the operating position as shown in FIGURE 1.

If however, the cultivator point engages under a relatively immovable object thus preventing the tripping action from occurring, the shear pin 31 is sheared thus permitting the entire cultivator shank and shovel assembly to be drawn clear of the implement without undue strain occurring to the associated structure.

FIGURE 3 shows an alternative embodiment of my device in which similar parts have been given corresponding reference characters.

It differs from the previous embodiment principally in the resilient means. In this embodiment, a bracket 38 is secured by bolt 39 to the cultivator shank at the rear of the housing and a pair of links 40 (only one of which is shown) are pivotally secured by the rear end 41 thereof to each side of the bracket 38 by means of pivot pin 42.

A rod 43 is pivotally secured by the rear end 44 thereof to adjacent the front end 45 of each of the links 40, said rod passing through bearing guides 46 formed upon each side of the housing at the rear end thereof.

These rods 43 extend forwardly upon each side of the housing and are spanned by a spring retainer plate 47 which is secured to the front end of the rods by means of nuts 48.

Tension springs 49 surround each of the rods and react between the plate 47 and the bearing guides 46, the action being similar to that hereinbefore described for the embodiments shown in FIGURES 1 and 2.

Since various modifications can be made in my invention as hereinabove described, and many apparently widely different embodiments of same made within the spirit and scope of the claims without departing from such spirit and scope, it is intended that all matter contained in the accompanying specifications shall be interpreted as illustrative only and not in a limiting sense.

What I claim as my invention is:

1. A holder for releasably retaining trippable cultivator shanks to the associated cultivator frame comprising in combination a housing secured to said frame, front and rear bearing means in said housing receiving the upper end of the associated cultivator shank, slidably therebetween for fore and aft motion between limits, means in said housing to receive said upper end of said cultivator shank when same is tripped, and resilient means reacting between said cultivator shank and said housing to retain said shank in the operating position when said upper end of said cultivator shank is between said front and rear bearing means, said means in said housing to receive said upper end of said cultivator shank when same is tripped, consisting of a saddle spanning the side walls of said housing below said rear bearing means, said saddle including a rear horizontal shank supporting portion, a downwardly and forwardly inclined portion extending from said first portion, and an upturned shank end receiving portion extending from said second portion.

2. The device according to claim 1 in which said front bearing means consists of a roller journalled for rotation within said housing and below said upper end of said cultivator shank, said rear bearing means consisting of a roller journalled for rotation within said housing and above said upper end of said cultivator shank.

3. The device according to claim 1 in which said resilient means includes a pair of forwardly extending links pivotally secured by the rear ends thereof to said cultivator shank behind said housing, a rod pivotally secured by the rear end thereof to the forward end of each of said links, said rods extending forwardly upon each side of said housing through bearing guides formed therein, a compression spring surrounding each rod and a retaining spring plate spanning the forward ends of said rod, said springs reacting between said retaining spring plate and said bearing guide.

4. The device according to claim 2 in which said resilient means includes a pair of forwardly extending links pivotally secured by the rear ends thereof to said cultivator shank behind said housing, a rod pivotally secured by the rear end thereof to the forward end of each of said links, said rods extending forwardly upon each side of said housing through bearing guides formed therein, a compression spring surrounding each rod and a retaining spring plate spanning the forward ends of said rod, said springs reacting between said retaining spring plate and said bearing guide.

5. The device according to claim 1 in which said resilient means includes a bracket secured to said shank behind said housing, shear pin means secured to the rear end of said housing, and a tension spring extending between said bracket and said shear pin means.

6. The device according to claim 2 in which said resilient means includes a bracket secured to said shank behind said housing, shear pin means secured to the rear end of said housing, and a tension spring extending between said bracket and said shear pin means.

References Cited in the file of this patent

UNITED STATES PATENTS

| 2,699,715 | Shelton | Jan. 18, 1955 |
| 2,906,353 | Rogers | Sept. 29, 1959 |

FOREIGN PATENTS

| 314/26 | Australia | Jan. 27, 1926 |
| 253,298 | Great Britain | June 17, 1926 |
| 269,394 | Great Britain | Apr. 21, 1927 |